(12) United States Patent
Rees et al.

(10) Patent No.: US 7,546,397 B2
(45) Date of Patent: Jun. 9, 2009

(54) SYSTEMS AND METHODS FOR ALLOWING MULTIPLE DEVICES TO SHARE THE SAME SERIAL LINES

(75) Inventors: Theodore D. Rees, Mountain View, CA (US); D. Stuart Smith, San Jose, CA (US); Dong Zheng, San Jose, CA (US)

(73) Assignee: Intersil Americas Inc., Milpitas, CA (US)

(*) Notice: Subject to any disclaimer, the term of this patent is extended or adjusted under 35 U.S.C. 154(b) by 93 days.

(21) Appl. No.: 11/625,116

(22) Filed: Jan. 19, 2007

(65) Prior Publication Data

US 2008/0098144 A1 Apr. 24, 2008

Related U.S. Application Data

(60) Provisional application No. 60/853,922, filed on Oct. 24, 2006.

(51) Int. Cl.
| | |
|---|---|
| G06F 3/00 | (2006.01) |
| G06F 13/28 | (2006.01) |
| G06F 1/00 | (2006.01) |
| G06F 13/12 | (2006.01) |
| G06F 13/38 | (2006.01) |
| G06F 11/00 | (2006.01) |
| G03F 1/00 | (2006.01) |
| G11C 5/00 | (2006.01) |
| H04N 7/167 | (2006.01) |

(52) U.S. Cl. .............. 710/36; 710/3; 710/22; 710/74; 430/5; 714/32; 365/52; 380/217; 713/300

(58) Field of Classification Search .......... 710/10, 710/74, 3, 22, 36; 430/5; 714/32; 365/52; 380/277; 713/300
See application file for complete search history.

(56) References Cited

U.S. PATENT DOCUMENTS 4,343,877 A * 8/1982 Chiang ................ 430/5

(Continued)

FOREIGN PATENT DOCUMENTS

WO WO 2004081921 A2 * 9/2004

OTHER PUBLICATIONS

"The I2C-Bus and How to Use It," Phillips Semiconductor (Apr. 1995).

*Primary Examiner*—Alford W Kindred
*Assistant Examiner*—Farley J Abad
(74) *Attorney, Agent, or Firm*—Fliesler Meyer LLP

(57) ABSTRACT

Methods and systems for allowing multiple devices to share the same serial lines (e.g., SDIO, SEN and SCLK) are provided. Such devices can be located, e.g., on an optical pick-up unit. Each device includes a serial interface, a device enable number (DEN) that differs from the DEN of each other device, and a plurality of registers, with at least one register being designated a device select register (DSR). The DSRs of the plurality of devices share a common address. The plurality of serial interfaces are collectively enabled and collectively disabled (e.g., via the SEN line). However, only one of the plurality of serial interfaces can be selected at one time, with the remaining of the plurality of serial interfaces being deselected. The serial interface of a device is selected when the DEN of the device is the same as the content of the DSR of the device, and deselected when the DEN of the device is not the same as the content of the DSR of the device.

27 Claims, 3 Drawing Sheets

U.S. PATENT DOCUMENTS

| | | | |
|---|---|---|---|
| 4,888,802 A * | 12/1989 | Cooney | 380/277 |
| 5,164,916 A * | 11/1992 | Wu et al. | 365/52 |
| 5,319,755 A * | 6/1994 | Farmwald et al. | 710/104 |
| 5,481,753 A * | 1/1996 | Miyake et al. | 710/3 |
| 5,987,614 A * | 11/1999 | Mitchell et al. | 713/300 |
| 6,912,361 B2 * | 6/2005 | Aronson et al. | 398/135 |
| 2002/0095620 A1 * | 7/2002 | Kuwayama | 714/32 |
| 2004/0064602 A1 * | 4/2004 | George | 710/22 |

* cited by examiner

SYSTEMS AND METHODS FOR ALLOWING MULTIPLE DEVICES TO SHARE THE SAME SERIAL LINES

PRIORITY CLAIM

This application claims priority under 35 U.S.C. 119(e) to U.S. Patent Application No. 60/853,922, filed Oct. 24, 2006, entitled SYSTEMS AND METHODS FOR ALLOWING MULTIPLE DEVICES TO SHARE THE SAME SERIAL LINES, which is incorporated herein by reference.

FIELD OF THE INVENTION

The present invention relates to systems and methods for allowing multiple devices to share the same serial lines. Such devices can be located, e.g., on an optical pick-up unit of a recording/reproducing apparatus, such as, but not limited to, DVD and CD drives, DVD camcorders, and DVD video recorders.

BACKGROUND

Many devices may be located on an optical pickup unit (OPU) of a recording/reproducing apparatuses (such as DVD and CD drives, DVD camcorders, DVD video recorders, etc.). Such devices can include, e.g., a laser diode driver (LDD), a power monitor integrated circuit (PMIC), and a photo-detector integrated circuit (PDIC). Conventionally, many aspects of such devices were not programmable after the device was placed on the OPU. Or if they were programmable, were only capable of being programmed once. However, as more and more types of media and standards exist, and manufacturers desire that the same devices can be used with the different types of media and standards, there is a desire that the devices on an OPU can be programmed by a controller that is located on a main board connected to the OPU via a flex cable.

There is also a desire to minimize the number of wires of the flex cable. Accordingly, it has been suggested that serial lines can be used to program at least one device on the OPU. For example, there exist some LDDs that include a serial interface, which can be used to program the LDD. More specifically, three serial lines, including a serial enable (SEN) line, a serial clock (SCLK) line and a serial data input/output (SDIO) line, which are part of the flex, have been used to write data to and read data from registers of LDDs. However, there is now a desire to program more than just the LDD.

One solution would be for each device to have their own dedicated serial lines. However, this would result in the flex cable including too many wires, which is undesirable, and often unacceptable. Another possible solution would be for each device to share the same serial clock and data lines but have their own serial enable line. In this manner, each device would receive the same clock and data signals, but only one device (the one to which the appropriate enable signal was sent) would be written to or read from at a time. This solution may work if there were very few devices on the OPU that were to be programmed. However, because this solution requires a separate serial enable line for each device to be programmed, this would also result in more wires than desired on the flex cable, especially as the number of programmable devices increased. Accordingly, there is still a need for a better way of being able to program multiple devices on an OPU using a common serial interface. Preferably, the number of lines on a flex cable should not be increased by the solution.

SUMMARY OF THE INVENTION

Embodiments of the present invention enable a plurality of devices to share the same serial lines. Such serial lines can include, e.g., a serial enable (SEN) line, a serial clock (SCLK) line and serial data input/output (SDIO) line. The plurality of devices can be devices that are configured to be on an optical pick-up unit (OPU). Examples of devices that are configured to be on an OPU include a laser diode driver (LDD) adapted to drive a laser diode, a power monitor integrated circuit (PMIC) to monitor the laser diode, and a photo-detector integrated circuit (PDIC) to detect light produced by the laser diode after the light has been reflected from an optical media. Further examples of devices configured to be on an OPU include, but are not limited to, a tilt detector, a focus motor driver, a tracking motor driver and an electrically erasable programmable read-only memory (EEPROM).

In accordance with specific embodiments of the present invention, each device includes a serial interface that can be selected or deselected. Additionally, each device includes a device enable number (DEN) that differs from the DEN of each other device configured to be commonly located (e.g., on the same OPU). Each DEN is preferably un-alterable, and can be, e.g., a metal masked number. Further, each device includes a plurality of registers, with at least one register of the device being designated a device select register (DSR), and with the DSRs of the plurality of devices sharing a common address.

The plurality of serial interfaces of the plurality of devices are configured to be connected to the same serial enable (SEN) line, the same serial clock (SCLK) line and the same serial data input/output (SDIO) line. Thus, the plurality of serial interfaces are collectively enabled and collectively disabled via the SEN line. However, only one of the plurality of serial interfaces can be selected at one time, with the remaining of the plurality of serial interfaces being deselected.

In accordance with specific embodiments of the present invention, the serial interface of a device is selected when the DEN of the device is the same as the content of the at least one register designated the DSR of the device. Conversely, the serial interface of a device is deselected when the DEN of the device is not the same as the content of the at least one register designated the DSR of the device.

In accordance with specific embodiments of the present invention, each serial interface of each device, in response to receiving a write command to the DSR of the device, will write to the DSR, thereby enabling changing of which one serial interface is selected.

In accordance with specific embodiments of the present invention, when the serial interface of a device is selected, the registers of the device including the registers that are not the DSR can be written to in response to a write command received by the serial interface of the device, and read from in response to a read command received by the serial interface of the device. However, when the serial interface of a device is deselected, only the DSR of the device can be written to in response to a write commend received by the serial interface, and no registers of the device can be read from in response to a read command received by the serial interface.

Further embodiments, and the features, aspects, and advantages of the present invention will become more apparent from the detailed description set forth below, the drawings and the claims

DETAILED DESCRIPTION

Figure 1:
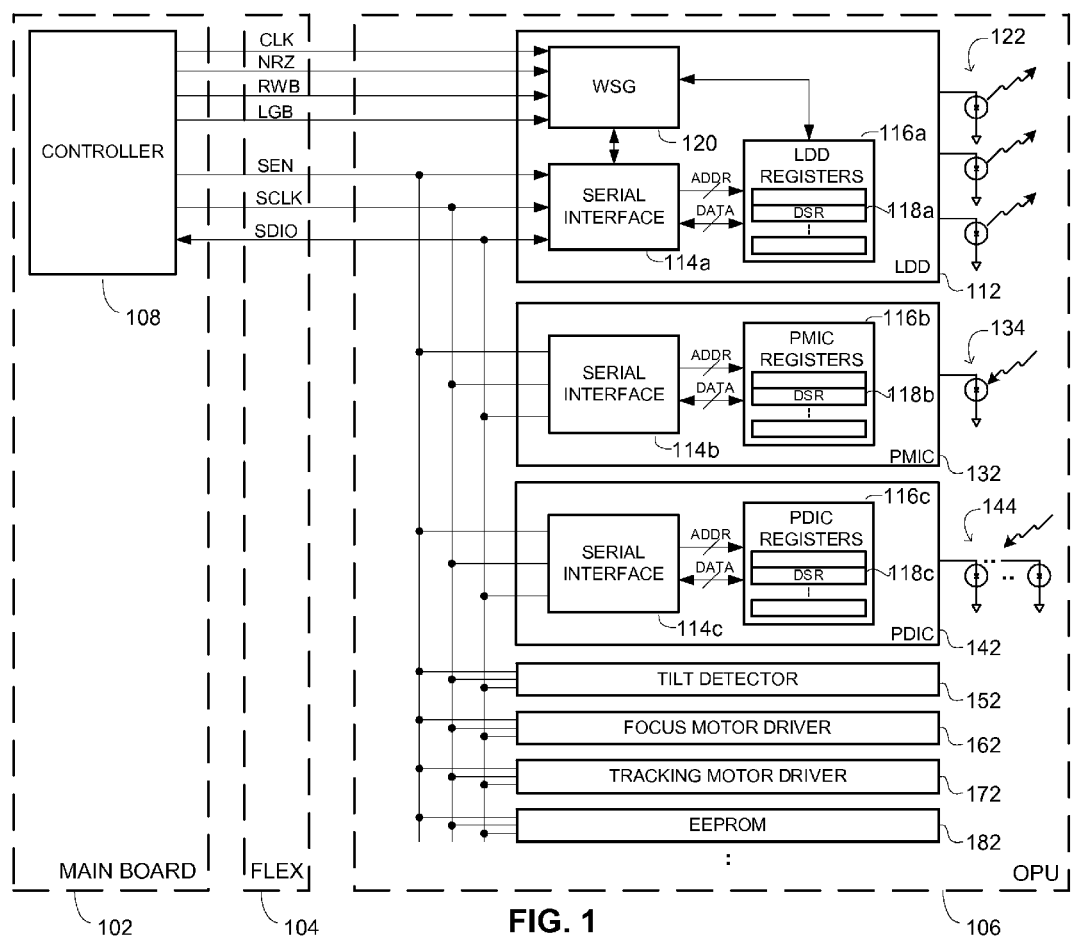
FIG. 1 is a high level block diagram of an information recording/reproducing apparatus, which is useful for describing embodiments of the present invention.

FIG. 1 shows portions of an information recording/reproducing apparatus including a main circuit board 102, a flex cable 104 and an optical pick-up unit (OPU) 106. The main board 102 includes a controller 108, which can also be referred to as a host controller, or simply a host. The main board can also include, e.g., an analog front end (AFE), a serial interface controller, and other devices not shown. The OPU 106 includes a laser diode driver integrated chip (LDD) 112, a power monitor integrated chip (PMIC) 132 and a photo-detector integrated chip (PDIC) 142. An LDD is also known as a laser driver integrated circuit (LDIC). The OPU 106 is also shown as including a tilt detector 152, a focus motor driver 162, a tracking motor driver 172 and an EEPROM 182. The OPU 106 can also include additional devices (also referred to as subsystems) not shown, or less device than shown.

The LDD 112 controls the current to laser diodes 122, causing one of the laser diodes 122 to output a light signal that, after being appropriately focused by an optical system (not shown), is incident on an a optical media disk (not shown). The magnitude of the current provided by the LDD 112 (which controls the output power of the laser diode 122) can vary depending on whether the laser diode is being used to read data from or write data to the media. Further, the magnitude of the current may also depend on specific disc media, DVD, CD or Blue-ray Disk (BD) standards, and/or the speed at which data is being read or written.

The LDD 112 is shown as being capable of driving three different laser diodes 122. For example, one of the laser diodes outputs a wavelength of about 780 nm (which used in CD technology), another laser diode outputs a wavelength of about 655 nm (which is used in DVD technology), and the remaining laser diode outputs a wavelength of about 405 nm (which is used for BD technology). Accordingly, LDD 112 can be used in CD, DVD and/or BD type devices. Of course, only one or two laser diode(s) can be used, if the LDD is only going to be used with one (or two) type(s) of technology. Its also possible that the LDD 112 drive more than three laser diodes. Also, the laser diodes can output light signals of other wavelengths than those mentioned above.

The LDD 112 is also shown as including a write strategy generator (WSG) 120 that implements an appropriate write strategy, which may depend, for example, on the media, CD, DVD or BD standards, and/or speed being supported. The WSG 120 is shown as receiving a data clock (CLK) line, a read write mode (RWB) line, a data line labeled NRZ (Non-Return-to-Zero), and a land/groove bar (LBG) line used for DVD RAM type media. A Low RWB signal can designate Write mode, and a High RWB signal can designate Read mode, or vice versa. The NRZ data line can alternatively support Return-to-Zero user data transfers. Other types of laser drivers where the WSG function is located in the controller 108 may also be used. When this is the case, the lines from the controller to the LDD can also include timing and amplitude information.

While not shown, the LDD 112 may also include other devices or subsystems, such as, but not limited to, an automatic power control (APC) subsystem, a running optical power control (ROPC) subsystem, drivers, analog-to-digital converters (DACs), oscillators, reference voltage circuitry, bias voltage circuitry, etc., many of which are controlled or programmed via registers 116a of the LDD 112. The registers 116a can also include data that controls or programs the WSG 120.

A photo-detector 134 detects optical signals output by one of the laser diodes 122 before the light signals reach the media, and provides a signal representative of the detected intensity to the PMIC 132. Multiple photo-detectors 144 detect the optical signal that has been reflected from the media (e.g., CD, DVD or BD media). An information signal produced by photo-detectors 144 includes user data, servo information and amplitude information. Samples of the amplitude of the information signal produced by the PDIC 142 can be provided to the ROPC circuit in the controller, which can adjust the laser power signal and current signal via the APC circuit to compensate for variations in the media. Samples of the signal produced by the photo-detector 134, in contrast, can be used by the APC to compensate for temperature variations and aging of the laser diodes 122.

The LDD 112 is also shown as including a serial interface 114a, which may also be referred to as a serial interface controller. The serial interface 114a is shown as being connected to the controller 108 on the main board 102 across the flex 104 via three wires, which include a serial enable (SEN) line, a serial clock (SCLK) line and a bi-directional serial data input/output (SDIO) line. The SDIO line allows the controller 108 to write data to and read data from the registers 116a within the LDD. Using these lines the controller 108 can program the LDD 112. Signals sent across the SEN, SCLK and SDIO lines are referred to, respectively, as SEN, SCLK and SDIO signals, or simply enable, clock and data signals. There are likely additional wires/lines between the controller 108 on the main board 102 and devices on the OPU 106, but such additional wires need not be discussed because they are not relevant to the embodiments of the present invention.

In accordance with specific embodiments of the present invention, the PMIC 132 includes its own a serial interface 114b, which is connected to the controller 108 on the main board 102 (across the flex 104) via the same SEN, SCLK and SDIO lines. The PMIC 132 also includes its own registers 1116b. Similarly, the PDIC 142 includes its own a serial interface 114c, which is connected to the controller 108 on the main board 102 (across the flex 104) via the same SEN, SCLK and SDIO lines. The PDIC 142 also includes its own registers 116c. The PMIC 132 and the PDIC 142 include additional portions not shown, which need not be discussed, because they are not relevant to the embodiments of the present invention.

In accordance with embodiments of the present invention, each device (e.g., LDD, PMIC, PDIC, etc.) that shares the same three serial lines (SEN, SCLK and SDIO) has one of its registers designated as a Device Select Register (DSR). More specifically, referring to FIG. 1, register 118a of the LDD registers 116a is designated the DSR for the LDD 112, register 118b of the PMIC registers 116b is designated the DSR for the PMIC 132, and register 118c of the PDIC registers 116c is designated the DSR for the PMIC 142. Additional devices of the OPU 106 can also include their own serial interface 114, registers 116, and DSR 118. Examples of such devices include, but are not limited to, the tilt detector 152, the focus motor driver 162, the tracking motor driver 172 and the EEPROM 182.

In accordance with an embodiment of the present invention, each of the DSR registers 118a, 118b and 118c has the same address, the reason for which will be clear from the description below. Further, each device includes its own unique device enable number (DEN), which can be, e.g., an 8-bit number. In accordance with a preferred embodiment, the DEN of each device is a metal masked number that is un-alterable. Other ways of assigning a DEN to a device are also possible, and within the scope of the present invention.

Whether a serial interface 114 of a device is selected or deselected is controlled by the content of the DSR 118 of the device. More specifically, if the content of a device's DSR 118 is the DEN of that device, then the serial interface of the device is selected; otherwise the serial interface of the device is deselected. When the serial interface of a device is deselected, that serial interface 114 of that device acts as a listener for its DSR, during which time the controller 108 on the main board 102 can only write to the DSR 118 of that device. That is, when a serial interface 114 of a device is deselected, the only register of that device that can be written to is the DSR 118 of that device. This means that read/write commands to any other registers of that device are ignored, and that reading of the DSR 118 of that device is also ignored. Further, any read to a deselected device will not cause the deselected device to go through a read cycle. Thus only the selected device can answer back to the controller.

The SEN line enables part of the serial interface control circuit whether or not the serial interface is enabled by the DEN and DSR or not. Specifically, the serial protocol first raises the SEN line. Then it clocks in a read/write bit. Then it clocks in address bits. Then if the serial interface is selected it clocks in the data bits to a shift register, followed by moving the contents of the shift register to the address specified. On the other hand, if the serial interface is deselected, the data is clocked into a shift register, but the contents of the shift register are not moved to the address specified. If the serial interface is selected and it is a read cycle, the contents of the addressed register are fetched to a shift register, then the contents of the shift register are clocked back to the controller (e.g., 108). If the serial interface is deselected, and it is a read cycle, no data is fetched to the shift register, contents of the shift register are not clocked out, and the SDIO line remains, e.g., tri-state. Thus the action of the SEN (Serial Enable), does not fully enable the serial action unless the DEN matches the contents of the DSR.

Further, when a serial interface 114 of a device is deselected or disabled, other portions of that device can be still be enabled. This is because the enablement and selection of the serial interface 114 is independent of the enablement of other portion of the device. For example, referring to FIG. 1, the LDD 112 can be driving a laser diode 122, even though the serial interface 114a of the LDD 112 is deselected. This can be accomplished, as explained below.

One or more register 118 of a device (e.g., 112, 132, 142, etc.) can be designated a control register that includes an enable bit, to which a "1" or a "0" can be written via the serial interface 114 of the device. For example, a "1" written to the device enable bit can indicate that the device is enabled, where a "0" written to the device enable bit can indicate that the device is disabled. This allows devices to be placed in standby or sleep mode, for conserving power. However, in accordance with an embodiment of the present invention, the serial interface 114 of a device can still be enabled, while the other portions of the device are disabled, so that the device can determine when it is to be enabled again.

As mentioned above, whether a serial interface 114 of a device is selected or deselected, the DSR of the device can always be written to. Remembering that each of the DSRs 118a, 118b, 118c, etc. (of the multiple devices) has the same address, if the address to which data is to be written is the address of the DSRs, then all the serial interfaces 114 that share the same SDIO will write the data to the DSR of their device. In this manner, the controller 108 can specify which serial interface 114 (and thus, which device) is selected by writing data (a binary number) equal to one of the devices' DEN to the DSRs 118 of the multiples devices. Because every device on the OPU 106 has a DEN that differs from the DENs of the other devices, only one device at a time can include data (i.e., a binary number) in its DSR 118 that is the same as the DEN of the device, meaning only one serial interface 114 can be selected at a time.

A serial interface 114 of a device compares the device's DSN to the contents of the device's DSR 118, to determine whether the serial interface is selected or deselected. As just mentioned, if the controller 108 is writing to the DSR register address, then all the serial interfaces 114 sharing the same three serial wires (SEN, SCLK, SDIO) will write to the DSR address. However, if the controller 108 is writing data to any other register address, then only the selected serial interface 114 will allow the data to be written. Also, if the controller 108 is reading data from a register (regardless of the address), then only the selected serial interface 114 will allow the data to be read.

For a more specific example, assume that the DSR is address 0000011 (i.e., 03hex). If the address of a 'write' command is 03hex, then the serial interface writes to address 03hex (the DSR) with the received data. If this data matches the device's DEN, that serial interface of the device will then become "selected". If not, the serial interface of the device would remain "deselected". In a similar manner, a serial interface of a device that was previously "selected" can become "deselected".

In the above described manner, multiple serial interfaces 114 of multiple devices can share the same three serial lines (e.g., SEN, SCLK, SDIO). An alternative to the above described embodiments would be for each serial interface (of each device on the OPU) to have their own three serial lines, but this would result in the flex including too many wires, which is undesirable. Another alternative to the above described embodiments would be each serial interface (of each device on the OPU) to share the same SCLK and SDIO lines but have their own SEN line. This may be fine if there were very few devices on the OPU that include a serial interface, however because there is a separate SEN line for each device with a serial interface, this would also result in more wires than desired on the flex 104.

A useful feature of specific embodiments of the present invention is that numerous (e.g., up to 256) different devices on the OPU 106 can share the same serial lines (e.g., three lines) by merely dedicating one 8-bit register (called the DSR) of each device to storing data to be compared to the DEN of the device. It is also possible that DENs are greater than 8 bits, and that multiple registers 118 of each device are used stored a value that is compared to a DEN that is more than 8 bits long. In other words, more than one register of a device can be designed a DSR. For example, each device can have a 16 bit DEN, and two 8-bit registers can be used as DSR, allowing for $2^{16}$ devices to have their serial interfaces independently selected and deselected.

In accordance with an embodiment, each device can include a comparator that compares the contents of the DSR of the device to the DSN of the device. For design flexibility, the design of the comparator that compares the DEN to the contents of the DSR can be done with an exclusive nor for each bit, followed with a wide AND gate. Thus when every bit matches, each exclusive nor outputs a 1 and the wide AND gate outputs a 1. If any bit does not match, that exclusive nor outputs a 0 and the wide AND gate outputs a zero. This is just one example of how the comparison can be accomplished. Other implementations are also within the scope of the present invention.

In accordance with an embodiment of the present invention, one or more further register 118 can be designated a delayed digital select register (DDSR), which stores the most recent contents of an actual DSR, after the contents of the actual DSR are changed. For example, whenever a DSR of a device is to be written to, the contents of the DSR can first be shifted into the DDSR of the device. The contents of the DDSR can thereafter be read (presuming the serial interface of that device is selected), e.g., for purposes of debugging, and the like.

In the above example, only 7 bits of data received over the SDIO line are used to designated an address, which would enable only 128 (2^7) different registers to be addressed on a device. To increase this, one or more bits of a control register of a device can be designated a page select bit(s), enabling as many registers as desired to be addressable, and thus accessable. For example, one page select bit can be used to select among two pages, two page select bits can be used to select among four pages, three select bits can be used to select among eight pages, etc.

Embodiments of the present invention take advantage of the fast speeds that are available using three serial lines, including the SEN, SCLK and SDIO lines, while allowing multiple devices to share such lines. Embodiments of the present invention are believed to be preferable to use of a conventional I2C bus/interface, because the embodiments of the present invention provide for much faster data transfers than an I2C bus. This is at least in part because the I2C protocol is significantly more complicated, resulting in the slower speeds. In addition the I2C interface uses resistor pull-ups, which slows down the signal speed.

While an I2C bus/interface can be useful for setting up a device, it is not fast enough to enable the changing of device parameters (e.g., power parameters) on-the-fly (i.e., in real-time), because the I2C interface is too slow. In contrast, embodiments of the present invention are fast enough to enable the changing of power parameters, and the like, in real-time. The faster speeds obtainable using embodiments of the present invention are in part due to the use of the SEN line, which enables accurate and efficient framing of clock and data signals. For example, when the SEN line is low, a device will not expect a clock or data signal. However, when the SEN line goes high (from low), a device will expect the beginning of a clock signal and a data signal. Then, when the SEN goes low (from high), a device will expect the end of the clock signal and data signal. In other words, the use of the SEN line enables devices to easily determine the beginning and end of the clock and data signals. In contrast, I2C requires a handshaking/synchronization type of embedded communication to identify the beginning and end of such signals.

Embodiments of the present invention can be used with various types of information recording/reproducing apparatuses, e.g., optical storage drives. More specific exemplary apparatuses include, but are not limited to, CD, DVD and Blue-ray drives, DVD or Blue-ray camcorders, and DVD or Blue-ray video recorders. For example, embodiments of the present invention can be used to change power levels during the reading and/or writing of optical media (e.g., an optical disk), while I2C would be too slow to do so. Such changes to power levels may occur in response to a defect on the optical media, or when changing from reading to writing. These are just a few exemplary applications for embodiments of the present invention, and are not meant to be limiting. Further, these are only a few examples of the advantages of the present invention over standard I2C communications.

While especially useful with information recording/reproducing apparatuses, it is also possible to use embodiments of the present invention in other environments. For example, while the embodiments of the present invention are especially useful for enabling multiple devices to share common serial lines, where the devices are located on an OPU, embodiments of the present invention can also be useful where the multiple devices are not located on an OPU. In other words, embodiments of the present invention can be used in other environments where there is a desire for multiple devices to share common serial lines. Embodiments of the present invention are especially useful where there is a desire to provide for faster serial communications than are available using I2C communications.

Figure 2:
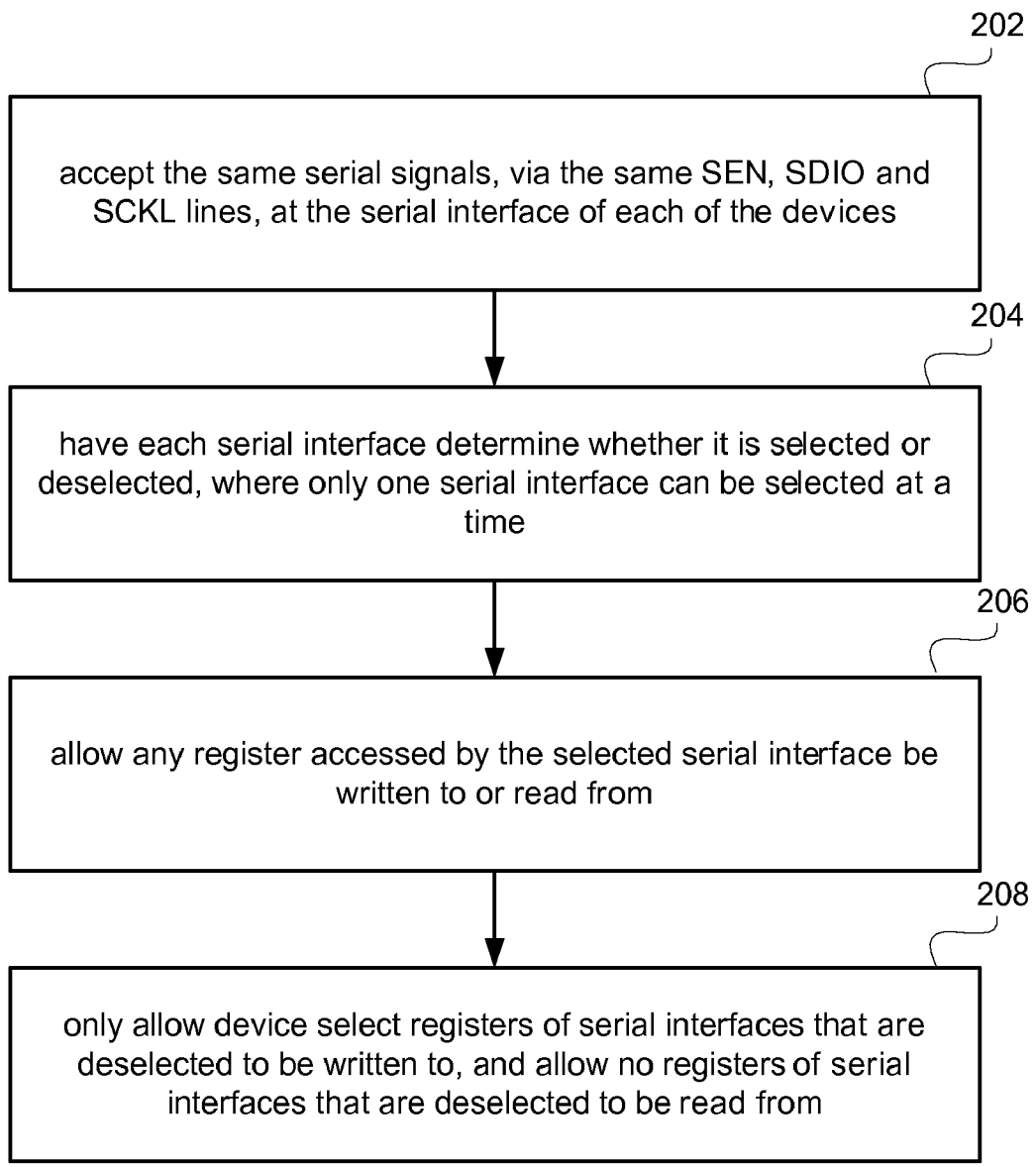
FIG. 2 is a high level flow diagram that is useful for describing how a plurality of devices can share the same three serial lines, in accordance with specific embodiments of the present invention.

The high level flow diagram of FIG. 2, which includes steps 202-208, is used to summarize a method, according to an embodiment of the present invention, for allowing a plurality of devices to share the same serial enable (SEN) line, the same serial clock (SCLK) line and the same serial data input/output (SDIO) line, where each device includes a serial interface and a plurality of registers accessible using the serial interface.

Figure 3:
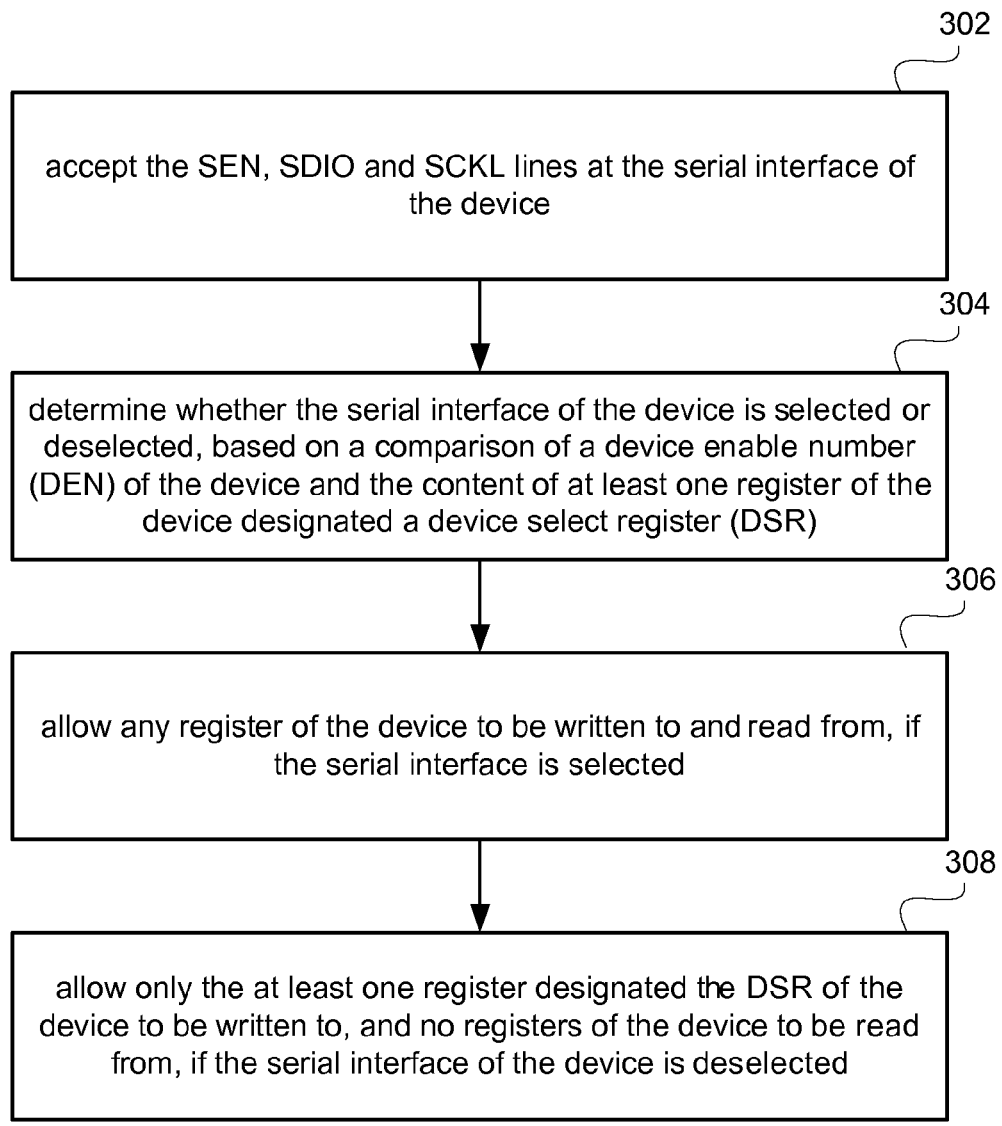
FIG. 3 is a high level flow diagram of FIG. 2 that is useful for summarizing how a device having a serial interface can share the same three serial lines with other devices also having a serial interface, in accordance with specific embodiments of the present invention.

The high level flow diagram of FIG. 3, which includes steps 302-308, is used to summarize a method, according to an embodiment of the present invention, for allowing a device having a serial interface to share the same serial enable (SEN), serial clock (SCLK) and serial data input/output (SDIO) lines with other devices also having a serial interface.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. It is intended that the scope of the invention be defined by the following claims and their equivalents.

What is claimed:

1. A system, comprising:
    a plurality of devices configured to be located on an optical pick-up unit (OPU), with each device including
        a serial interface that can be selected or deselected;
        a device enable number (DEN) that differs from the DEN of each other said device configured to be located on the OPU; and
        a plurality of registers, with at least one register of the device being designated a device select register (DSR);
    wherein the DSRs of the plurality of devices share a common multi-bit address that is addressable in a same manner as the registers that are not the DSR;
    wherein the plurality of serial interfaces of the plurality of devices are configured to be connected to the same serial enable (SEN) line, the same serial clock (SCLK) line and the same serial data input/output (SDIO) line;

wherein the plurality of serial interfaces are collectively enabled and collectively disabled via the SEN line;

wherein only one of the plurality of serial interfaces can be selected at one time, with the remaining of the plurality of serial interfaces being deselected;

wherein the serial interface of a said device is selected when the DEN of the device is the same as the content of the at least one register designated the DSR of the device;

wherein the serial interface of a said device is deselected when the DEN of the device is not the same as the content of the at least one register designated the DSR of the device;

wherein each said serial interface of each said device, in response to receiving a write command to the DSR of the device, will write to the DSR, thereby enabling changing of which one said serial interface is selected;

wherein once the serial interface of a said device is selected, the selected serial interface remains selected until a write command is used to change the content of the at least one register designated the DSR of the device so that the DEN of the device is no longer the same as the content of the at least one register designated the DSR of the device;

wherein while the serial interface of a said device remains selected, data can be written to the registers of the device including the registers that are not the DSR in response to write commands being received by the serial interface of the device; and wherein while the serial interface of a said device remains selected, data can be read from the registers of the device including the registers that are not the DSR in response to read commands being received by the serial interface of the device.

2. The system of claim 1, wherein when the serial interface of a said device is deselected, no registers of the device can be read from, in response to a read command received by the serial interface of the device.

3. The system of claim 2, wherein when the serial interface of a said device is deselected, the only register of the device that can be written to is the DSR of the device.

4. The system of claim 1, wherein a further portion of a said device can be in an enabled state, when the serial interface of the device deselected.

5. The system of claim 1, wherein a further portion of a said device can be disabled, when the serial interface of the device is enabled.

6. The system of claim 1, wherein the plurality of devices include:
a laser diode driver (LDD) adapted to drive a laser diode;
a power monitor integrated circuit (PMIC) to monitor the laser diode; and
a photo-detector integrated circuit (PDIC) to detect light produced by the laser diode after the light has been reflected from an optical media.

7. The system of claim 1, wherein the plurality of devices includes at least two devices selected from the following:
a laser diode driver (LDD);
a power monitor integrated circuit (PMIC);
a photo-detector integrated circuit (PDIC);
a tilt detector;
a focus motor driver;
a tracking motor driver; and
an electrically erasable programmable read-only memory (EEPROM).

8. The system of claim 1, wherein each DEN is un-alterable.

9. The system of claim 8, wherein each DEN is a metal masked number.

10. The system of claim 1, wherein each said device comprises:
a delayed digital select register (DDSR), which stores the most recent content of the DSR of the device, after the content of the DSR of the device is changed in response to a write command to the DSR of the device.

11. The system of claim 1, wherein the registers other than the device select registers (DSRs) are written to and read from in the following manner:
the shared SEN line is used to transition from collectively disabling the plurality of serial interfaces to collectively enabling the plurality of serial interfaces;
after the shared SEN line is used to transition from collectively disabling the plurality of serial interfaces to collectively enabling the plurality of serial interfaces, the first bit transferred via the SDIO line, which is a read/write bit, specifies whether a write operation or a read operation is to occur, and the address bits following the read/write bit specify a register on which to perform the operation; and
only the selected one of the plurality of serial interfaces will perform the write or read operation on the addressed register of the device associated with the selected one of the plurality of serial interfaces.

12. The system of claim 1, wherein the SEN line, which can be in one of a first state and a second state, enables framing of signals received by the plurality of devices via the SCLK line and the SDIO line in accordance with the following:
when the SEN line is in the first state, the plurality of devices do not expect to receive a signal via the SCLK line and do not expect to receive a signal via the SDIO line;
when the SEN line is in the second state, the plurality of devices expect to receive a signal via the SCLK line and expect to receive a signal via the SDIO line;
when the SEN line transitions from the first state to the second state, the plurality of devices are informed of a beginning of a signal received via the SCLK line and a beginning of a signal received via the SDIO line; and
when the SEN line transitions from the second state to the first state, the plurality of devices are informed of an end of a signal received via the SCLK line and an end of a signal received via the SDIO line.

13. The system of claim 12, wherein when the SEN line is in the second state, the plurality of serial interfaces are placed in standby or sleep mode.

14. A system, comprising:
a plurality of devices each device including
a serial interface that can be selected or deselected;
a device enable number (DEN) that differs from the DEN of each other said device; and
a plurality of registers, with at least one register of the device being designated a device select register (DSR);
wherein the DSRs of the plurality of devices share a common multi-bit address that is addressable in a same manner as the registers that are not the DSR;
wherein the plurality of serial interfaces are collectively enabled and collectively disabled via a same serial enable (SEN) line that is connected to the serial interface of each of the plurality of devices;
wherein only one of the plurality of serial interfaces can be selected at one time, with the remaining of the plurality of serial interfaces being deselected;

wherein the serial interface of a said device is selected when the DEN of the device is the same as the content of the DSR of the device;

wherein the serial interface of a said device is deselected when the DEN of the device is not the same as the content of the DSR of the device;

wherein each said serial interface of each said device, in response to receiving a write command to the DSR of the device, will write to the DSR, thereby enabling changing of which one said serial interface is selected;

wherein once the serial interface of a said device is selected, the selected serial interface remains selected until a write command is used to change the content of the at least one register designated the DSR of the device so that the DEN of the device is no longer the same as the content of the at least one register designated the DSR of the device;

wherein while the serial interface of a said device remains selected, data can be written to the registers of the device including the registers that are not the DSR in response to write commands being received by the serial interface of the device; and wherein while the serial interface of a said device remains selected, data can be read from the registers of the device including the registers that are not the DSR in response to read commands being received by the serial interface of the device.

15. The system of claim 14, wherein:

when the serial interface of a said device is deselected, only the DSR of the device can be written to in response to a write commend received by the serial interface, and no registers of the device can be read from in response to a read command received by the serial interface.

16. The system of claim 15, wherein a further a portion of a said device:

can be in an enabled state, when the serial interface of the device is deselected; and can be in a disabled state, when the serial interface of the device is enabled.

17. The system of claim 14, wherein each DEN is unalterable.

18. The system of claim 14, wherein each said device comprises:

a delayed digital select register (DDSR), which stores the most recent content of the DSR of the device, after the content of the DSR of the device is changed in response to a write command to the DSR of the device.

19. The system of claim 14, wherein the registers other than the device select registers (DSRs) are written to and read from in the following manner:

the same SEN line is used to transition from collectively disabling the plurality of serial interfaces to collectively enabling the plurality of serial interfaces;

after the SEN line is used to transition from collectively disabling the plurality of serial interfaces to collectively enabling the plurality of serial interfaces, the first bit transferred via a serial data input/output (SDIO) line that is connected to the serial interface of each of the plurality of devices, specifies whether a write operation or a read operation is to occur, and the address bits following the first bit specify a register on which to perform the operation; and only the selected one of the plurality of serial interfaces will perform the write or read operation on the addressed register of the device associated with the selected one of the plurality of serial interfaces.

20. A method for allowing a plurality of devices to share the same serial enable (SEN) line, the same serial clock (SCLK) line and the same serial data input/output (SDIO) line, where each device includes a serial interface and a plurality of registers accessible using the serial interface, the method comprising:

(a) accepting the same serial signals, via the same SEN, SDIO and SCLK lines, at the serial interface of each of the devices;

(b) collectively enabling and collectively disabling the serial interfaces of the plurality of devices based on the signal received via the SEN line shared by the plurality of devices;

(c) while the plurality of serial interfaces are enabled, having each serial interface determine whether it is selected or deselected, where only one serial interface can be selected at a time;

(d) while the plurality of serial interfaces are enabled, allowing any register accessed by the selected serial interface be written to or read from;

(e) only allowing device select registers (DSRs) accessible via serial interfaces that are deselected to be written to, and allowing no registers accessible via serial interfaces that are deselected to be read from;

(f) in response to each serial interface receiving a write command to the DSR of the device, writing to the DSRs of the plurality of devices, thereby enabling changing of which one serial interface is selected;

(g) once the serial interface of one of the devices is selected, causing the selected serial interface to remain selected until a write command is used to change the content of the at least one register designated the DSR of the device so that the DEN of the device is no longer the same as the content of the at least one register designated the DSR of the device;

(h) while the serial interface of one of the devices remains selected, allowing data to be written to the registers of the device including the registers that are not the DSR in response to write commands being received by the serial interface of the device; and (i) while the serial interface of one of the devices remains selected, allowing data to be read from the registers of the device including the registers that are not the DSR in response to read commands being received by the serial interface of the device.

21. The method of claim 20, wherein each of the plurality of devices has a device enable number (DEN) and at least one register that is designated the device select register (DSR) for the device, and wherein step (c) includes having each device compare its DEN to the content of its DSR.

22. The method of claim 20, further comprising:

storing the most recent content of the DSR in a delayed digital select register (DDSR), in response to a write command to the DSR.

23. A method for allowing a device having a serial interface to share the same serial enable (SEN), serial clock (SCLK) and serial data input/output (SDIO) lines with other devices also having a serial interface, the method comprising:

(a) accepting the SEN, SDIO and SCLK lines, which are shared with the other devices, at the serial interface of the device;

(b) determining whether the serial interface of the device is enabled or disabled based on a signal received via the same SEN line that is shared with the other devices;

(c) determining whether the serial interface of the device is selected or deselected, based on a comparison of a device enable number (DEN) of the device and the content of at least one register of the device designated a device select register (DSR);

(d) allowing any register of the device to be written to and read from, if the serial interface is selected;

(e) allowing only the at least one register designated the DSR of the device to be written to, and no registers of the device to be read from, if the serial interface of the device is deselected;

(f) in response to the serial interface of the device receiving a write command to the DSR of the device, writing to the DSR of the device, thereby enabling changing of whether the serial interface is selected;

(g) once the serial interface of the device is selected, causing the serial interface to remain selected until a write command is used to change the content of the at least one register designated the DSR of the device so that the DEN of the device is no longer the same as the content of the at least one register designated the DSR of the device;

(h) while the serial interface of the device remains selected, allowing data to be written to the registers of the device including the registers that are not the DSR in response to write commands being received by the serial interface of the device; and (i) while the serial interface of the device remains selected, allowing data to be read from the registers of the device including the registers that are not the DSR in response to read commands being received by the serial interface of the device;

wherein steps (c), (d), (e), (f), (g), (h) and (i) are only performed when the serial interface of the device is determined to be enabled at step (b).

24. A device that is capable of sharing the same serial enable (SEN) line, the same serial clock (SCLK) line and the same serial data input/output (SDIO) line, with other devices, comprising:

a serial interface to accept the SEN, SDIO and SCLK lines, which are shared with the other devices;

a plurality of registers, with at least one register being designated a device select register (DSR), where the address of the DSR is a predetermined address that is the same address as DSRs of other devices; and a device enable number (DEN) that differs from the DEN of other devices;

wherein the serial interface of the device is enabled or disabled based on a signal received via the same SEN line that is shared with the other devices;

wherein when the serial interface is enabled the serial interface is selected or deselected, based on a comparison of the DEN of the device and the content of the at least one register designated the DSR;

wherein when the serial interface is enabled the serial interface allows any register of the device to be written to and read from, if the serial interface is selected;

wherein when the serial interface is enabled the serial interface allows only the at least one register designated the DSR of the device to be written to, and no registers of the device to be read from, if the serial interface of the device is deselected;

wherein when the serial interface is disabled, none of the plurality of registers of the device can be written to or read from;

wherein the serial interface of the device, in response to receiving a write command to the DSR of the device, will write to the DSR, thereby enabling changing of whether the serial interface is selected;

wherein once the serial interface of the device is selected, the serial interface remains selected until a write command is used to change the content of the at least one register designated the DSR of the device so that the DEN of the device is no longer the same as the content of the at least one register designated the DSR of the device;

wherein while the serial interface of the device remains selected, data can be written to the registers of the device including the registers that are not the DSR in response to write commands being received by the serial interface of the device; and wherein while the serial interface of the device remains selected, data can be read from the registers of the device including the registers that are not the DSR in response to read commands being received by the serial interface of the device.

25. The system of claim 24, wherein the device comprises: a delayed digital select register (DDSR), which stores the most recent content of the DSR of the device, after the content of the DSR of the device is changed in response to a write command to the DSR of the device.

26. The device of claim 24, wherein the SEN line, which can be in one of a first state and a second state, enables framing of signals received by the device via the SCLK line and the SDIO line in accordance with the following:

when the SEN line is in the first state, the device does not expect to receive a signal via the SCLK line and does not expect to receive a signal via the SDIO line;

when the SEN line is in the second state, the device expects to receive a signal via the SCLK line and expects to receive a signal via the SDIO line;

when the SEN line transitions from the first state to the second state, the device is informed of a beginning of a signal received via the SCLK line and a beginning of a signal received via the SDIO line; and when the SEN line transitions from the second state to the first state, the device is informed of an end of a signal received via the SCLK line and an end of a signal received via the SDIO line.

27. The device of claim 26, wherein when the SEN line is in the second state, the serial interface is placed in standby or sleep mode.

* * * * *